United States Patent
Cooper et al.

[11] Patent Number: 5,967,230
[45] Date of Patent: Oct. 19, 1999

[54] IN SITU WATER AND SOIL REMEDIATION METHOD AND SYSTEM

[76] Inventors: Kent Cooper, 8603 Blackcreek Blvd., Orlando, Fla. 32829; Robert J. Crim, 285 E. Stetson Ave. - #8, DeLand, Fla. 32724; James Carey, 7147 Hammock Lakes Dr., Viera, Fla. 32940; John Bowers, 8155 Whistlewing Ct., Orlando, Fla. 32817

[21] Appl. No.: 08/970,846

[22] Filed: Nov. 14, 1997

[51] Int. Cl.⁶ .............................. A62D 3/00; B09C 1/08; C02F 1/72; E21B 43/30

[52] U.S. Cl. ........................... 166/245; 166/52; 166/270; 166/370; 210/170; 210/747; 210/759; 405/128; 588/205; 588/206

[58] Field of Search ............................ 166/52, 245, 270, 166/370; 210/170, 747, 758, 759, 908, 909; 405/128, 263; 588/205, 206, 900

[56] References Cited

U.S. PATENT DOCUMENTS

| | | | |
|---|---|---|---|
| 4,167,973 | 9/1979 | Forte et al. ............................ | 166/267 |
| 4,591,443 | 5/1986 | Brown et al. .......................... | 210/747 |
| 4,882,021 | 11/1989 | Barnhart . | |
| 4,927,293 | 5/1990 | Campbell .............................. | 405/128 |
| 4,936,706 | 6/1990 | Lüftenegger et al. ................. | 405/128 |
| 4,978,508 | 12/1990 | Hansen et al. . | |
| 5,043,080 | 8/1991 | Cater et al. ......................... | 210/759 X |
| 5,114,497 | 5/1992 | Johnson et al. ...................... | 405/128 X |
| 5,286,141 | 2/1994 | Vigneri ................................. | 405/128 |
| 5,364,508 | 11/1994 | Weres et al. ........................ | 210/758 X |
| 5,415,777 | 5/1995 | Krempen et al. .................... | 435/262.5 |
| 5,425,598 | 6/1995 | Pennington ........................... | 405/128 |
| 5,472,619 | 12/1995 | Holzhauer et al. ................... | 210/721 |
| 5,520,483 | 5/1996 | Vigneri ................................. | 405/128 |
| 5,525,008 | 6/1996 | Wilson ................................. | 405/128 |
| 5,611,642 | 3/1997 | Wilson ................................. | 405/128 |
| 5,690,173 | 11/1997 | Abdul et al. .......................... | 166/268 |
| 5,741,427 | 4/1998 | Watts et al. .......................... | 210/747 |
| 5,789,649 | 8/1998 | Batchelor et al. .................... | 588/206 |

*Primary Examiner*—George Suchfield
*Attorney, Agent, or Firm*—Allen, Dyer, Doppelt, Milbrath & Gilchrist, P.A.

[57] ABSTRACT

The remediation treatment creates environmentally neutral species from hydrocarbon contaminants. A catalyst is injected into the site and is permitted to diffuse through the site. An oxidizing agent is then introduced into the site to release a free radical in a Fenton-type reaction. The compounds react to release a free radical, which acts upon the contaminants to form environmentally neutral species. Diffusion of both compounds is aided by turbulence induced in the groundwater. Reaction vapors are collected above ground, filtered, and vented to the atmosphere.

35 Claims, 3 Drawing Sheets

IN SITU WATER AND SOIL REMEDIATION METHOD AND SYSTEM

BACKGROUND OF THE INVENTION

1. Field of the Invention

The present invention relates to methods and systems for remediating contaminated water and soil, and, more particularly, to such methods and systems for decontaminating sites from organics and heavy metals.

2. Description of Related Art

Following a long period of environmental neglect, the United States and other countries have placed a high priority on remediating contaminated sites. It is estimated that between 300,000 and 400,000 contaminated sites are scheduled for cleanup in the United States in the coming decades, at an estimated cost as high as $500 billion to $1 trillion (National Research Council, "Alternatives for Ground Water Cleanup", Washington, D.C.: National Academy Press, 1994; M. Russell et al., *Hazardous Waste Remediation: The Task Ahead,* Knoxville: University of Tennessee, 1991). U.S. spending on waste site remediation totaled approximately $9 billion in 1996 alone.

Despite this considerable investment, conventional technologies for remediating contaminated sites, especially those with contaminated ground water, are inadequate. For example, the National Research Council has conducted a study of conventional ground water cleanup systems at 77 contaminated sites and determined that ground water cleanup goals had been achieved at only 8 of the sites and that full achievement was highly unlikely with the in-place technologies at 34 of the 77 sites (NRC, ibid., 1994; MacDonald and Kavanaugh, *Envir. Sci. Tech.* 28(8), 362A–68A, 1994). Based on these findings, it is believed that improved technologies are needed to restore contaminated sites.

The most common types of contaminants found at waste sites include chlorinated solvents, petroleum hydrocarbons, and metals (NRC, 1994). Chlorinated solvents, such as trichloroethane (TCE) and perchloroethylene (PCE), are used for such purposes as dry cleaning and degreasing industrial manufacturing equipment and cleaning military aircraft. Petroleum hydrocarbons commonly found in ground water include the components of gasoline, such as benzene, toluene, ethylbenzene, and xylene. Other common contaminants of ground water include naphthalene and chlorinated solvents. Because of the widespread use of both chlorinated solvents and petroleum hydrocarbons, contaminated ground water has been found in many sites around the world. Additional ground-water and soil contaminants comprise polycyclic aromatic hydrocarbons (PAHs), created from combustion, coal coking, and process, petroleum refining, and wood-treating operations; and polycholorinated biphenyls (PCBs), once widely used in electrical transformers and capacitors and for a variety of other industrial purposes.

Some conventional technologies for cleaning contaminated ground water are based on the principle that if enough water is pumped from the site, the contaminants will eventually be flushed out. In such "pump and treat" systems, the pumped-out water is treated ex situ to remove contamination, which has limited effectiveness, especially for cleaning up undissolved sources of contamination beneath the water table. Key contaminant and subsurface properties that interfere with flushing include: solubility of contaminants into water; diffusion of contaminant into micropores and zones with limited water mobility; absorption of contaminants to subsurface materials; and heterogeneity of the subsurface. Because of the difficulty of flushing contaminants from the subsurface, the NRC concluded in its 1994 study that pump and treat systems would likely be unable to restore fully many types of contaminated sites.

During the 1990s, as the limitations of conventional subsurface remedial technologies have become increasingly clear, new technologies have emerged to clean up contaminated soil and leaking underground storage tanks containing petroleum products. Some of these newer technologies used on contaminated ground water at U.S. Superfund sites include air sparging, bioremediation, passive treatment wall, dual-phase extraction, in situ well aeration, in situ oxidation, and pump and treat. Those used to clean up contaminated ground water at underground storage tanks include biosparging, dual-phase extraction, air sparging, in situ bioremediation, pump and treat, and intrinsic remediation. Air sparging, dual-phase extraction, pump and treat, passive treatment wall, and in situ well aeration technologies include high equipment and labor costs with mechanical treatment of ground water. Bio- and intrinsic remediation have exhibited a long-term approach but are largely unproven, primarily owing to problems associated with providing an environment optimal for multiplication of the microbes while consuming the contaminant(s).

Systems have been known in the art for oxidizing hydrocarbons to harmless chemical constituents. A strong oxidizing agent known for such a use is hydrogen peroxide. In a reaction known as the Fenton reaction, hydrogen peroxide can be mixed with a metallic salt such as ferrous sulfate to produce a free radical, which breaks bonds in the hydrocarbon molecule in an exothermic reaction to produce a low-free-energy state, generally comprising a production of carbon dioxide and water.

Particular in situ systems utilizing Fenton-type reactions have been disclosed by Brown (U.S. Pat. No. 4,591,443) and Wilson (U.S. Pat. No. 5,611,642), both of which include mixing the Fenton reactants prior to introduction into the soil and ground water. Vigneri (U.S. Pat. Nos. 5,286,141 and 5,520,483) has described a remediation method and system that includes a preacidification of the ground water prior to a sequential introduction of the Fenton reactants, wherein hydrogen peroxide is added after an injection of ferrous sulfate at a high concentration.

SUMMARY OF THE INVENTION

It is an object of the present invention to provide a system and method for remediating a site containing hydrocarbon contaminants.

It is also an object to provide such a system and method that are in situ.

It is another object to provide such a method and system for delivering a remediating reaction to a contaminated site.

It is a further object to provide such a method and system for controlling a remediating reaction within a contaminated site.

These and other objects are achieved by the method and system of the present invention, an in situ ground water and soil remediation treatment utilizing a Fenton-type reaction.

In a first embodiment, the method comprises the steps of introducing a first compound into a site that contains ground water and soil contaminated with a hydrocarbon. Typically testing will have been undertaken to determine the location and extent of the "contaminant plume," that is, the spread of the contaminant throughout the site. The site is preferably essentially chemically untreated prior to the first compound's introduction. The first compound is permitted to diffuse through the site, allowing sufficient time for the first compound to achieve equilibrium within the contaminant plume.

Next a second compound is introduced into the site. This second compound comprises an oxidizing agent that has the ability to react with the first compound to release a free radical in a Fenton-type reaction. The first and second compounds are permitted to react to release a free radical, which is permitted to act upon a site contaminant to form an environmentally neutral species. Exemplary first and second compounds comprise, but are not intended to be limited to, a metallic salt and hydrogen peroxide, respectively. As described above, the neutral species may comprise such compounds as carbon dioxide and water, although these species are not intended as limitations.

In a second embodiment of the invention, the first compound is introduced into a contaminated site and is permitted to diffuse therethrough, such diffusion aided by turbulence induced in the groundwater. The second compound is introduced, also with turbulence induced in the ground water to facilitate dispersion. Again, the Fenton-type reaction is permitted to occur, decontaminating the site.

In a third embodiment of the invention, a system is provided for remediating a contaminated site. In a particular embodiment, an injection portal is introduced into the site beneath the water table, through which the first and second compounds can be introduced. Means are further provided for introducing turbulence into the ground water to enhance the diffusion of the compounds and their mixing. In a particular embodiment means are also provided for venting accumulated gases from the reaction site.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

Figure 1:
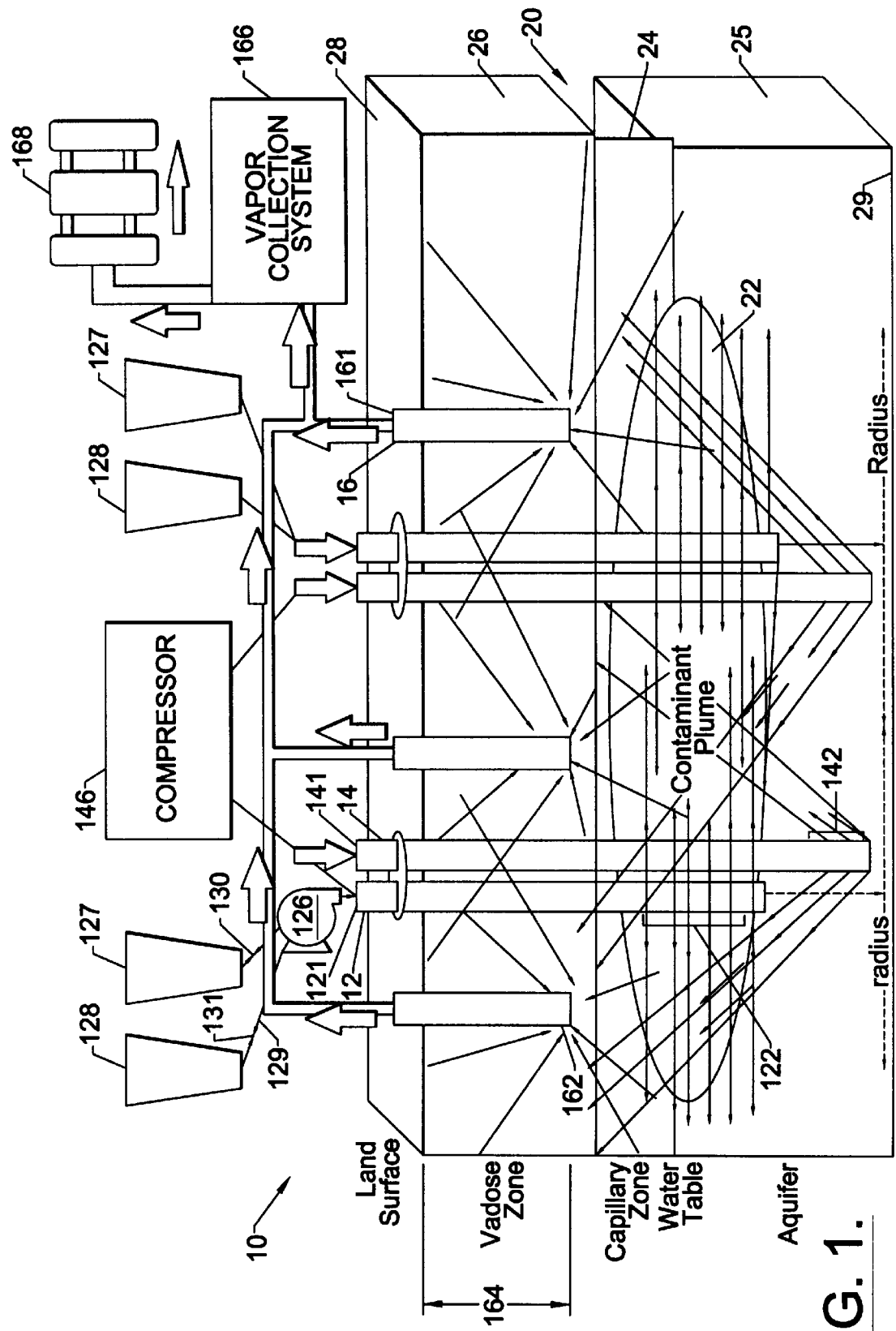
FIG. 1 is a side cross-sectional schematic view of the remediation system.
Figure 2:
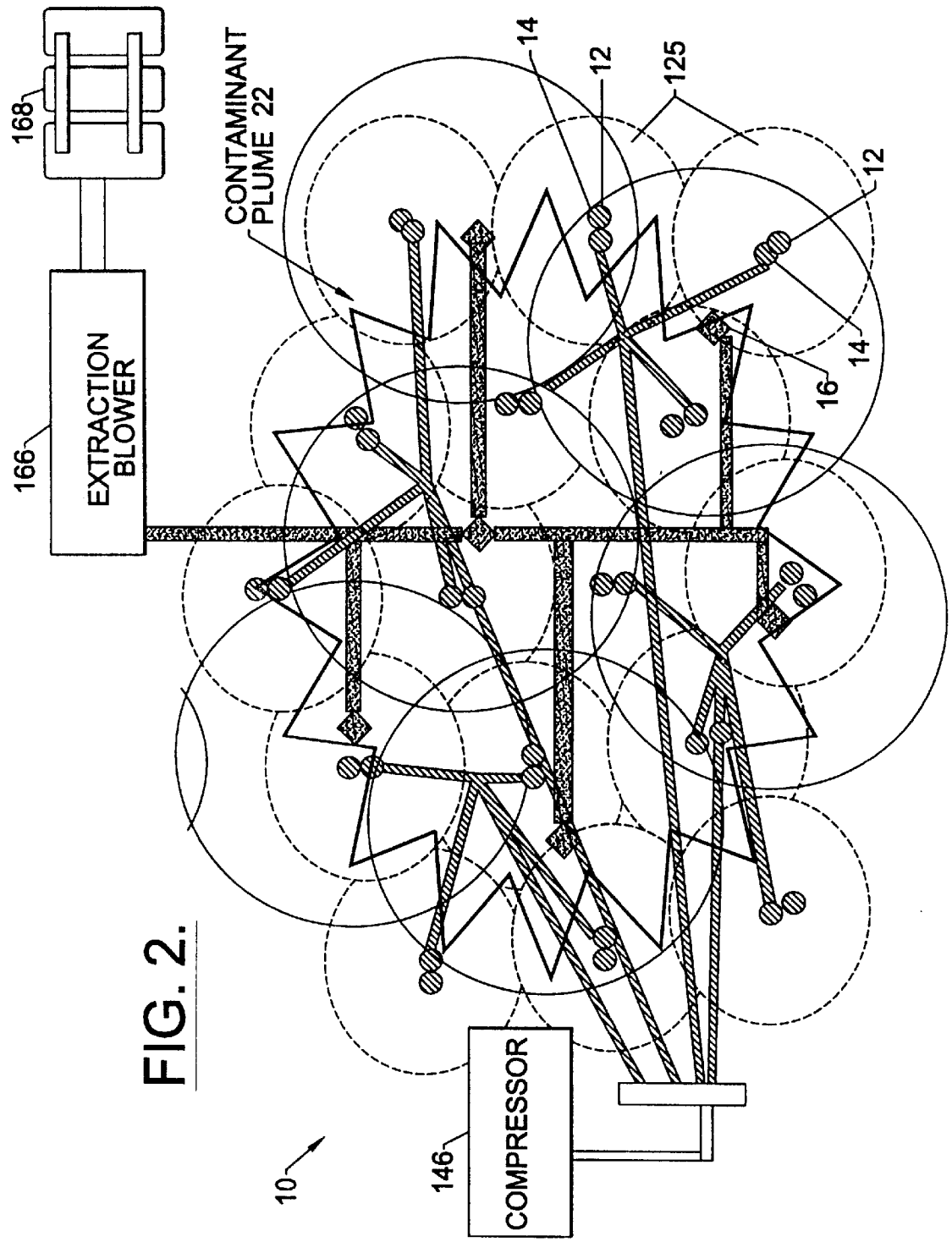
FIG. 2 is a plan view of the remediation system.
Figure 3:
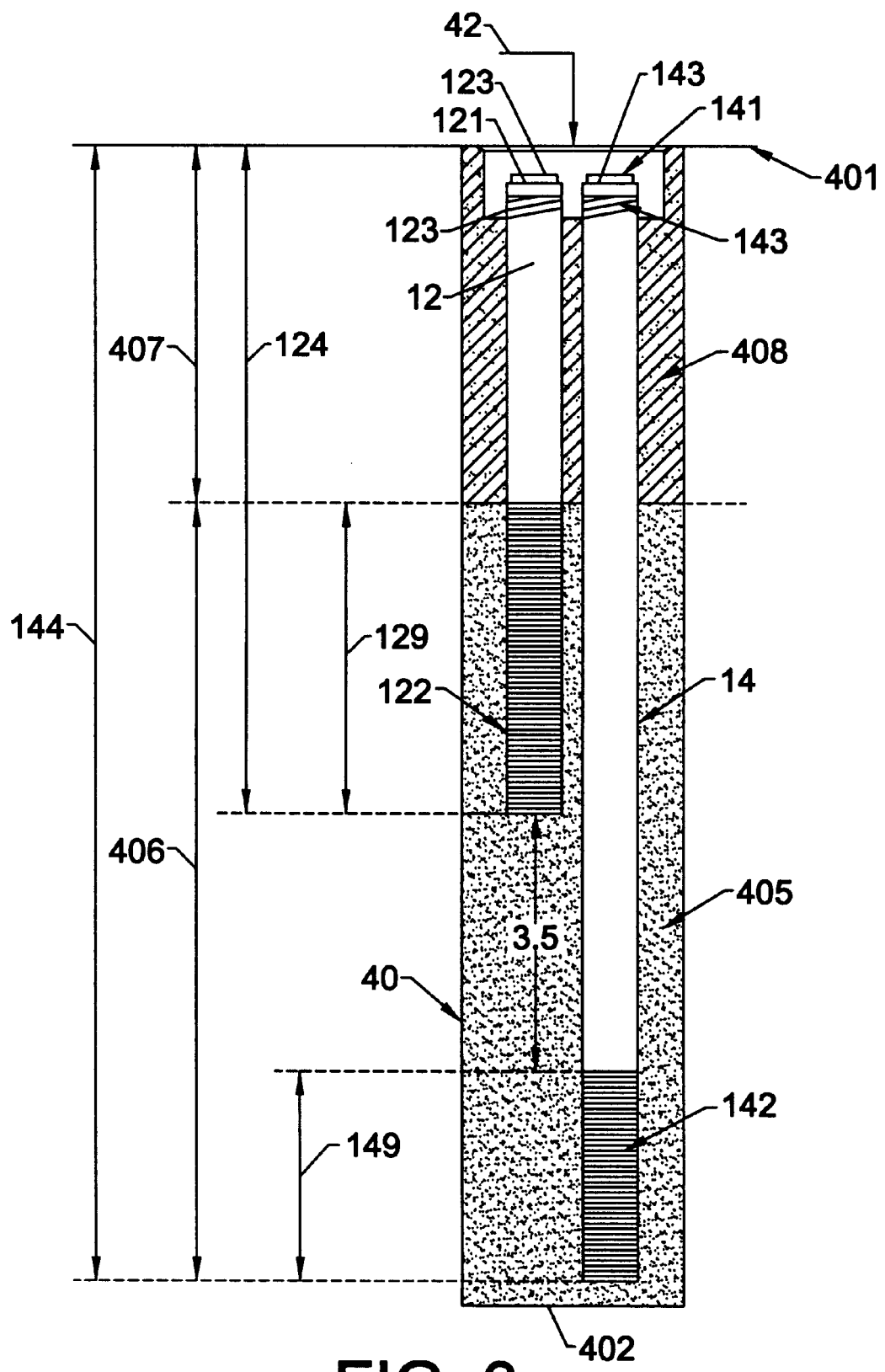
FIG. 3 is a side cross-sectional view of an injection point.

A description of the preferred embodiments of the present invention will now be presented with reference to FIGS. 1–3.

The Chemical Process

The system and method comprise a chemical oxidation process for remediating a site having ground water and soil containing contaminants such as, but not limited to, constituents of gasoline, diesel fuel, dry cleaning and industrial solvents, creosote, polychlorinated biphenyls, other organic-based contaminants, heavy metals, and metal biproducts. An exemplary oxidation reaction, that of benzene, with a free radical proceeds as:

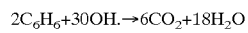

Since the hydroxyl radical has such a short lifetime (~ms), it is preferable that it be generated in situ. The Fenton pathway for accomplishing this using ferrous ion as an exemplary reactant is:

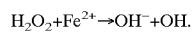

Using this reaction, organic molecules can be oxidized in a substrate through the addition of an oxidizing agent such as hydrogen peroxide and a reactant such as ferrous ion solution.

The amount of reactant required is site-specific and can be seen by one of skill in the art to be related to the physico-chemical characteristics of the site, including the volume of contaminant present, hydraulic conductivity, soil porosity, pH, and buffering capacity of the ground water and soil.

Hydrogen peroxide, being a weak acid ($K_a=2\times10^{-12}$), causes a reduction in the pH of the ground water into which it is introduced. However, upon spontaneous decomposition into water and oxygen gas, the pH returns to normal. The temporary pH depression is advantageous to the reaction, since the creation of hydroxyl radical is favored at lowered pH. The oxygen gas added to the site is also advantageous in creating an environment favorable to microbiological recolonization of the treated area, enhancing biodegradation of any remaining contaminants.

The Fenton reaction is exothermic, which is also favorable for the process of the present invention, since desorption of contaminants is favored at higher temperatures.

Elements, Placement, and Operation of the System

Prior to the introduction of the remediation system 10 into the site 20, a contamination assessment is preferably performed to determine the location of the contaminant plume 22, which is shown schematically in FIG. 1 to be located within the capillary zone 24 and the aquifer 25, beneath the vadose zone 26. As schematically indicated in plan view (FIG. 2), the contaminant plume 22 will typically comprise an irregular shape.

Preferably a zone or radius of influence 125 should be determined prior to installation of the system. The zone of influence 125, which is defined for the purposes of the present invention as a radial distance from an injection point to a location at which the hydrogen peroxide concentration is diluted to less than a predetermined minimum amount, here chosen to be 0.3% by weight. Such a determination can be made by an analytical estimate or by performing a pilot test whereby the zone of influence 125 is physically established. A typical zone of influence 125 comprises approximately 10 feet, although it will be obvious to one of skill in the art that this can vary over a wide range.

The apparatus of a preferred embodiment of the remediation system 10 is depicted schematically in FIG. 1 in cross section and in FIG. 2 in plan view. A plurality of injection portals 12 are constructed and installed in spaced relation from each other such that their zones of influence 125 overlap each other. The depth 124 of their outlets 122 is preferably beneath the contaminant plume 22.

Fenton reactants are introduced into inlets 121 in the injection portals 12 from above-ground vessels, an iron sulfate vessel 127 and a hydrogen peroxide vessel 128. Each vessel 127,128 is in fluid communication via piping 129 to a pump 126 (only one shown in FIG. 1) for facilitating the reactants' introduction into the injection portal 12. Valves 130,131 are provided between each vessel 127,128, respectively, and the pump 126 to permit the selective introduction of each reactant.

In use, the first compound, in a preferred embodiment comprising ferrous sulfate solution at a concentration of 0.3–300 ppm, is introduced first and is allowed sufficient time to diffuse through the site 20. An exemplary time for achieving diffusion is 24 hours, although this is not intended as a limitation.

The second compound, the oxidizing agent, in a preferred embodiment comprising hydrogen peroxide at a concentration of 5–50 wt %, is injected and permitted to react with the ferrous ion, releasing a free radical that acts upon the site contaminants to form environmentally neutral species, including carbon dioxide and water.

In a preferred embodiment means are also provided for causing turbulence in the ground water during the introduction of each of the reactants for facilitating their dispersion throughout the site 20. A plurality of pressurized gas portals 14 are installed, one adjacent each injection portal 12 and having an outlet 142 at a depth 144 beneath that 124 of the injection portal 12. (Under some conditions the depth 144 may be chosen to be above that 124 of the injection portal 12; therefore, this arrangement is not intended as a limitation.) An air (or other gas) compressor 146 is operated in a plurality of on/off cycles to inject gas into the gas portals' inlets 141, which provides turbulent mixing of the reactants and substantially overcomes any naturally occurring preferential pathway in the aquifer 25.

An exemplary injection point (FIG. 3) comprises a unitary bore 40 into which the injection 12 and pressurized gas 14 portals are placed. The portals 12,14 each comprise pipe, such as PVC pipe, at their upper ends, and fluid-permeable material, such as well screen, at their bottom ends. Thus the outlets 122,142 represent a fluid-permeable region 129,149, respectively, in each of the portals 12,14. The portals 12,14 also include locking caps 123,143 affixed via a threaded top portion 123,143 of each portal 12,14. An exemplary bore 40 has a diameter of 8 in. and a depth sufficient to reach beneath the contaminant plume 22 and above a confining layer 29. After insertion of the portals 12,14, the bore 40 is filled from the bottom 402 to a first depth 406 with a packing material 405, such as 6/20 silica sand. The remainder of the bore 40 is filled to a sink depth 407 with grout 408. The portals' inlets 121,141 are left exposed beneath the surface 28, and the top 401 of the bore 40 is covered with a removable cover, such as a manhole 42.

Another feature of a preferred embodiment of the present invention comprises means for extracting a vapor component of the reaction product(s) from below ground. This extraction is believed important owing to the explosive nature of the volatilized contaminants, which can accumulate. This feature is believed preferable over simply monitoring the site, as migration of the vapors may occur into unknown areas, which may include remote locations such as basements, sewer pipes, or other underground utilities. Such a potentially dangerous explosive environment is avoided with the use of the present invention, which provides a vapor collection system to establish a partial vacuum in the vadose zone 26.

The vapor collection system in a preferred embodiment comprises an extraction blower 166 connected via piping to the top openings 161 of a plurality of pressurized gas portals 16. Each gas portal 16 extends to a depth 164 in the vadose zone 26, where vapors are collected into a bottom opening 162. An activated carbon filter system 168 is also provided in a preferred embodiment, through which the vapors collected into the blower 166 pass prior to venting into the atmosphere.

Exemplary Field Study

A field study was undertaken at a highly contaminated petroleum tank site comprising the following site-specific geology:

0–2.5 ft black, organic silty, fine-grained quartz sand 2.5–4.0 ft dark brown, silty, well-consolidated hardpan 4.0–12.5 ft brown, silty, fine-grained quartz sand The site-specific hydrogeology studies indicated that ground water monitor wells at 1.0 gpm dried the wells. Recharge to the monitor wells was low. A surficial water table aquifer thickness of 15 ft was based on deep monitor well boring lithology. An assumed porosity of 15% was also based on boring lithology.

Free hydrocarbon contaminant was observed in the vadose zone soil around the petroleum dispenser island, under the concrete apron in front of the building, and adjacent the former tank pad area. Free contaminant was also observed in the capillary fringe of the former tank pad area. Excessively contaminated soils extended from approximately 0.5 ft below ground to the capillary fringe.

The remediation system in this example included 35 bores, a catalyst injection of 1.4 wt % at 3 gpm followed by an oxidant injection of 25 wt % at 1.3 gpm. The results for six injection points (IP) are presented in Table 1 at $t_0$ and $t_1$, 1 week later. Measured quantities are given in units of micrograms per liter ($\mu g/L$) or parts per billion (ppb). BDL=below detection limit; % red=percent reduction; BTEX=benzene, toluene, ethyl benzene, and xylene; MTBE=methyl tert-butyl ether; naph=total naphthalenes. The data in this table indicate that the process and system of the present invention are effective in significantly reducing contaminants to environmentally acceptable values. Such values may be determined by local regulations mandating such values as drinking water standards and soil cleanup goals. The flexibility of the present invention makes it efficacious for reaching virtually any level desired.

Measurements were also made throughout the remediation time from $t_0$ to 48 hours of temperature, pH, and conductivity, and these are displayed in Table 2. The data indicate that the site returns to approximately its pretreatment pH and temperature within 48 hours, and the conductivity is reduced to 0.1% of the value measured upon introduction of catalyst solution.

TABLE 1

Process Exemplary Field Study Results

| | IP1, $t_0$ | IP1, $t_1$ | % red | IP2, $t_0$ | IP2, $t_1$ | % red |
|---|---|---|---|---|---|---|
| benzene | 1900 | 260 | 86.3 | 11000 | 1800 | 83.6 |
| toluene | 1100 | 180 | 83.6 | 1300 | 110 | 91.5 |
| xylenes | 3600 | 820 | 77.2 | 8500 | 1500 | 82.4 |
| BTEX | 7220 | 1380 | 80.9 | 23300 | 3890 | 83.3 |
| MTBE | BDL | BDL | n/a | BDL | BDL | n/a |
| naph | 380 | 172 | 54.7 | 1040 | 314 | 69.8 |
| EB | 0.02 | 0.02 | n/a | 0.02 | 0.02 | n/a |
| lead | 22 | 19 | 13.6 | 66 | 3 | 95.5 |

| | IP3, $t_0$ | IP3, $t_1$ | % red | IP4, $t_0$ | IP4, $t_1$ | % red |
|---|---|---|---|---|---|---|
| benzene | 17000 | 60 | 99.6 | 15000 | 4 | 100 |
| toluene | 32000 | 620 | 98.1 | 26000 | 8 | 100 |
| xylenes | 14000 | 2400 | 82.9 | 12000 | 5 | 100 |
| BTEX | 65200 | 3300 | 94.9 | 54900 | 17 | 100 |
| MTBE | BDL | BDL | n/a | BDL | BDL | n/a |
| naph | 2050 | 1760 | 14.1 | 920 | 10 | 98.9 |
| EB | 0.78 | 0.18 | 76.9 | 80 | 4.2 | 94.8 |
| lead | 122 | 16 | 86.9 | 62 | 3 | 95.2 |

TABLE 1-continued

Process Exemplary Field Study Results

|  | IP5, $t_0$ | IP5, $t_1$ | % red | IP6, $t_0$ | IP6, $t_1$ | % red |
|---|---|---|---|---|---|---|
| benzene | 17000 | 140 | 99.2 | 20000 | 300 | 98.5 |
| toluene | 23000 | 190 | 99.2 | 22000 | 68 | 99.7 |
| xylenes | 10000 | 72 | 99.3 | 10000 | 100 | 99.0 |
| BTEX | 51500 | 414 | 99.2 | 53800 | 504 | 99.1 |
| MTBE | BDL | BDL | n/a | BDL | BDL | n/a |
| naph | 716 | 10 | 98.6 | 850 | 10 | 98.8 |
| EB | 29 | 2.6 | 91.0 | 2.1 | 0.26 | 87.6 |
| lead | 22 | 3 | 86.4 | 130 | 3 | 97.7 |

TABLE 2

Site Physical Conditions during Remediation

| Time (h) | Temp. (° C.) | pH | Cond. (mS/cm) |
|---|---|---|---|
| 0 | 25.9 | 5.9 | 600 |
| 2.5 | 41.8 | 4.4 | 580 |
| 5 | 55.6 | 3.5 | 520 |
| 7.5 | 34.1 | 4.2 | 480 |
| 48 | 29.7 | 5.9 | 0.6 |

It may be appreciated by one skilled in the art that additional embodiments may be contemplated, including alternative reactants and portal arrangements.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

What is claimed is:

1. A method for remediating a contaminated site comprising the steps of:
   introducing a first compound into a site containing ground water and soil having a hydrocarbon contaminant therein, the site essentially chemically untreated prior to the first compound introduction;
   permitting the first compound to diffuse through the site;
   introducing a second compound into the site, the second compound comprising an oxidizing agent reactable with the first compound to release a free radical;
   permitting the first and the second compounds to react to release a free radical; and
   permitting the free radical to act upon a site contaminant to form an environmentally neutral species.

2. The method recited in claim 1, wherein the second compound comprises hydrogen peroxide.

3. The method recited in claim 1, wherein the first compound comprises a metallic salt.

4. The method recited in claim 3, wherein the metallic salt comprises iron sulfate.

5. The method recited in claim 1, wherein the first and the second compounds are reactable via a Fenton-type reaction.

6. The method recited in claim 1, wherein the introduction steps comprise injecting the first and the second compounds at a plurality of locations selected to permit diffusion of the first and the second compounds throughout the site.

7. A method for remediating a contaminated site comprising the steps of:
   introducing a first compound into a site containing ground water and soil having a hydrocarbon contaminant therein;
   permitting the first compound to diffuse through the site;
   introducing a second compound into the site, the second compound comprising an oxidizing agent reactable with the first compound to release a free radical;
   during the first and the second compound introducing steps, causing turbulence in the ground water to facilitate dispersion of the first and the second compound throughout the site;
   permitting the first and the second compounds to react to release a free radical;
   permitting the free radical to act upon a site contaminant to form an environmentally neutral species.

8. The method recited in claim 7, further comprising the step of extracting a vapor component of the environmentally neutral species below ground.

9. The method recited in claim 7, wherein:
   the first and the second compound introducing steps comprise injecting the first and the second compound at a first location; and
   the turbulence-causing step comprises injecting a gas in a plurality of on/off pressure cycles at a second location in spaced relation to the first location.

10. The method recited in claim 9, wherein the second location comprises a depth lower than a depth of the first location.

11. A method for controlling a Fenton-type reaction at a contaminated site comprising the steps of:
   introducing a Fenton reagent into a below-ground contaminated site;
   enhancing a diffusion of the Fenton reagent throughout the site;
   introducing an oxidizing agent into the site;
   enhancing a diffusion of the oxidizing agent throughout the site;
   permitting a Fenton reaction to occur, releasing a free radical;
   permitting the free radical to act upon a contaminant to form environmentally neutral species.

12. The method recited in claim 11, further comprising the step of extracting a gaseous component of the environmentally neutral species.

13. A method for delivering a Fenton-type reaction to a contaminated below-ground site comprising the steps of:
   creating a portal into a contaminated site beneath a water table thereof, the contaminated site essentially free from prior chemical treatment;
   introducing a Fenton reagent into the portal;
   permitting the Fenton reagent to diffuse through the site;
   introducing an oxidizing agent into the portal;
   permitting a Fenton reaction to occur, releasing a free radical for acting upon contaminant bonds to create environmentally neutral species therefrom.

14. The method recited in claim 13, further comprising the steps, following the Fenton reagent introducing step, of causing turbulence in the site groundwater, for facilitating the diffusion permitting step.

15. The method recited in claim 14, wherein the portal comprises a first portal and the turbulence-causing step comprises:
creating a second portal into the site in spaced relation to the first portal beneath a depth thereof; and
injecting a gas into the second portal in a plurality of on/off pressure cycles.

16. A system for remediating a contaminated site comprising:
means for sequentially introducing a first and a second composition into a site containing ground water and soil having a hydrocarbon contaminant therein, the site essentially chemically untreated, the first and the second compositions comprising Fenton-type reactants; and
means for introducing turbulence in the ground water, for facilitating a dispersion of the first and the second composition throughout the site and for enhancing a mixing thereof.

17. The system recited in claim 16, wherein the turbulence introducing means comprises a source of gas under pressure.

18. The system recited in claim 17, wherein the composition introducing means comprises a first portal having an outlet at a first depth below a water table.

19. The system recited in claim 18, wherein the turbulence introducing means further comprises a second portal having an outlet at a second depth below the first depth and above a confining layer.

20. The system recited in claim 16, further comprising means for collecting vapors produced during Fenton reaction.

21. The system recited in claim 20, wherein the vapor collecting means comprises means for introducing a partial vacuum within the site.

22. The system recited in claim 16, wherein the composition introducing means comprises a plurality of injection portals positioned throughout the site in spaced relation from each other.

23. The system recited in claim 22, wherein each injection portal has a radius of influence within the site and the injection portals are positioned to achieve overlapping radii of influences therebetween to achieve essentially complete diffusion of the Fenton-type reactants throughout the site.

24. The system recited in claim 22, wherein each injection portal has an outlet at a first depth beneath a water table of the site.

25. The system recited in claim 24, wherein the turbulence introducing means comprises a plurality of pressurized gas portals positioned throughout the site in spaced relation from each other and from the injection portals.

26. The system recited in claim 25, wherein each gas portal has an outlet at a second depth beneath the first depth.

27. The system recited in claim 26, further comprising means for collecting vapor produced by a reaction of the Fenton-type reactants.

28. The system recited in claim 27, wherein the vapor collecting means comprises a vapor capture portal having a first opening at a third depth above the water table.

29. The system recited in claim 28, wherein the vapor collecting means further comprises means for applying a partial vacuum to a second opening of the vapor capture portal for enhancing a removal of vapor from the site.

30. The system recited in claim 29, further comprising a means in fluid communication with the vacuum applying means for filtering collected vapors.

31. The system recited in claim 30, wherein the filter means comprises an activated carbon filter having an inlet in communication with the vacuum applying means and an outlet in communication with the atmosphere.

32. The system recited in claim 16, wherein the composition introducing means comprises a first pipe having an opening at an outlet end and the turbulence introducing means comprises a second pipe having an opening at an outlet end.

33. The system recited in claim 32, further comprising:
means for creating a bore having a diameter sufficient to place the first and the second pipe thereinto and a depth sufficient to reach beneath a water table of the site; and
a fluid-permeable packing for surrounding the first and the second pipe in the bore.

34. A remediation site for reducing a below-ground contaminant level, the site comprising:
ground water and soil having been essentially chemically unpretreated;
a contaminant plume having a hydrocarbon contaminant therein present in the ground water and the soil;
means for sequentially introducing a first and a second composition into the contaminant plume, the first and the second compositions comprising Fenton-type reactants; and
means for introducing turbulence in the ground water, for facilitating a dispersion of the first and the second composition throughout the contaminant plume and for enhancing a mixing thereof.

35. The site recited in claim 34, further comprising a vapor extraction system for collecting reaction gases, the system comprising:
means for producing a partial vacuum; and
a vapor capture portal having a bottom opening below ground spaced above the contaminant plume and a top opening above ground in fluid communication with the vacuum producing means.

* * * * *